Patented Mar. 15, 1932                                                            1,849,940

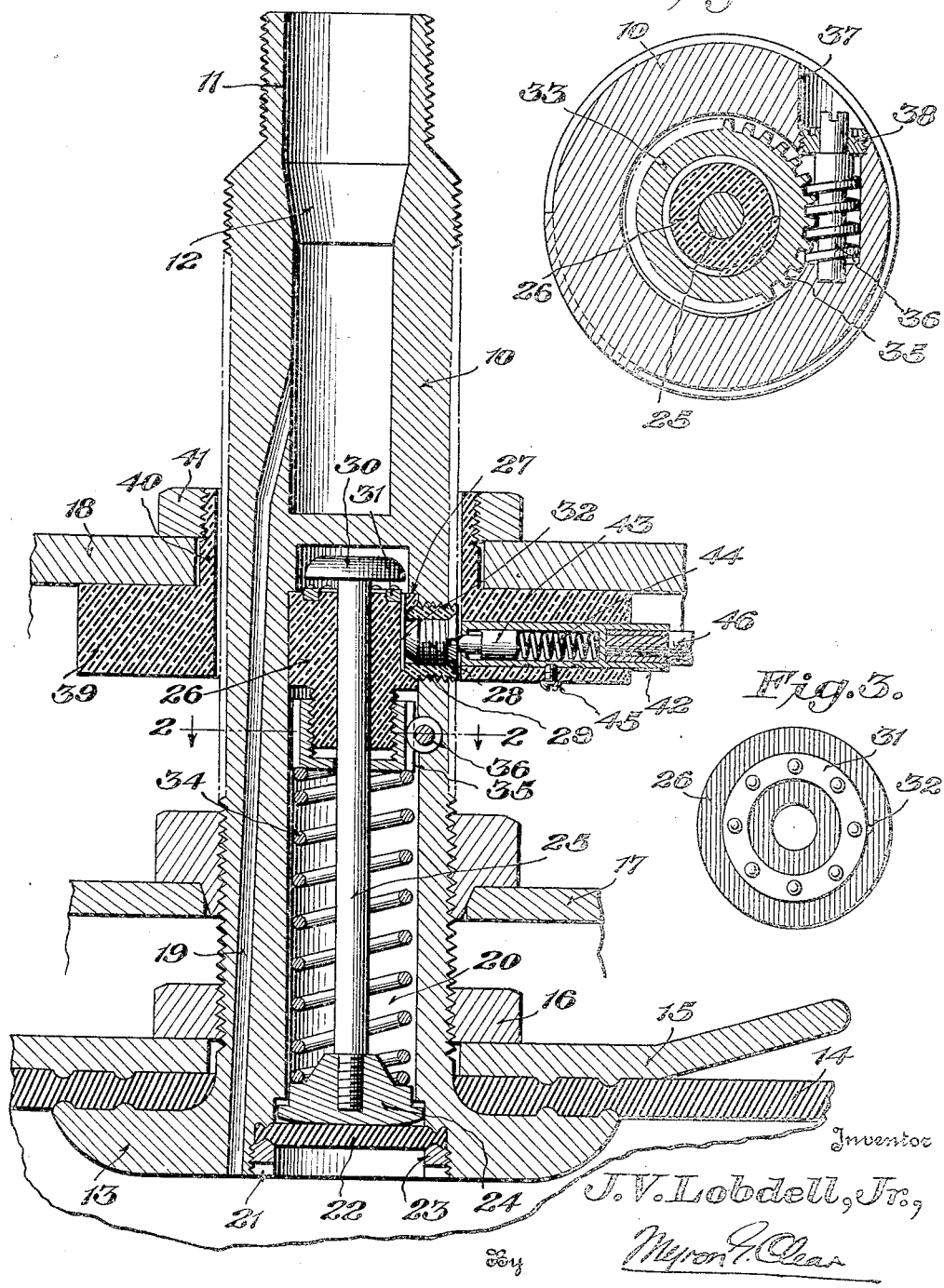

UNITED STATES PATENT OFFICE

JOHN V. LOBDELL, JR., OF ROSEDALE, MISSISSIPPI

TIRE PRESSURE INDICATOR

Application filed August 27, 1930. Serial No. 478,210.

My present invention relates generally to tire signals or alarms whose purpose is to notify the operator of a pneumatically tired vehicle of the fall of pressure in any one of the tires below a predetermined point.

More particularly, my invention relates to electrically actuated signals individual to the several tires, such as described and claimed in my copending application, Serial Number 441,332, which was filed April 3, 1930.

In my previous application, just referred to, a system is disclosed wherein the electrical signals are controlled by the making of circuits through parts at the valve stems of the tires, requiring special boring of the rims and fellies and special aperturing of the tire tubes.

It is the primary object of my present improvements to provide pressure controlled contacts in connection with a valve stem wherein the structure and arrangement of parts permits of its association in the first instance with a tire tube in the same manner as the usual valve stem, and it is a further object to avoid the necessity of special boring of the fellies and rims as well as to permit of freely demounting the rims in the manner in which this is ordinarily accomplished.

The improvements of my present invention, relating as they do to the pressure controlled contact making portion of the general system, are to be understood as applicable to, and useful in, not only the particular system of my previous application, above referred to, but also any other system whereby when contact is made at one of the valve stems, this fact is communicated to the vehicle operator through any annunciator, dial indicator, individual wheel lights, or the like located convenient to the operator's seat.

With the above in mind, the improvements of my present application will be more apparent from the following description of the details thereof, reference being had to the accompanying drawings forming a part of this specification, and in which, Figure 1 is a vertical longitudinal section through a tire valve stem embodying my improvements;

Figure 2 is a detail cross section taken therethrough on line 2—2 of Figure 1; and, Figure 3 is a detailed top plan view of the contact-carrying bushing.

Referring now to these figures, I have shown in Figure 1 a tire valve stem 10 of the same external appearance as the usual stem, having a chambered cap receiving end 11, the chamber of which has an internal seat 12 for the usual tire valve (not shown). The other end of the stem is flanged as at 13 as usual in order to permit of its association with the stem receiving opening of the tire tube 14 which is clamped, around its opening, between the flange 13 and the usual clamping plate 15 by means of a nut 16 engaging plate 15 and threaded on the stem 10.

It is understood that the stem 10 is intended to extend as usual through the ordinary opening of the tire rim 17 and through the felly 18 of a wheel when the rim is placed thereon, and it is also that air passes into and out of the tire tube 14 through a channel 19 of the stem 10 which, in the present instance, extends from the chambered end 11 through the wall of the stem and opens through the flanged end 13 at one side of a bore 20.

The bore 20 extends from a threaded counter-bore 21 at the flanged end of the stem and terminates short of the valve receiving chamber of the stem end 11 so that a diaphragm 22 which is effectively clamped and secured in air-tight relation within the counter-bore 21 by a threaded ring 23, will be subjected to air pressure upon its outer face only, that is, the pressure existing within the tire tube 14. This diaphragm 22 closes the outer end of the bore 20 and receives against its inner face the pressure head 24 at one end of an axial pin 25 in the bore 20.

The other end of pin 25 is movable through the axial opening of a bushing 26 formed of any suitable insulating material and seated with the inner end portion of the bore 20 against an internal shoulder 27 of the stem. This bushing has a side recess receiving the inner end of a contact screw 28 threaded laterally through the wall of the stem 10 within an insulating sleeve 29. In this way the contact screw, whose outer end terminates approximately flush with the external surface of the stem 10, serves to lock the bushing 26 in place against the shoulder 27.

Within the space between the bushing 26 and the inner closed end of the bore 20, the pin 25 has a contact head 30 and in its adjacent face the bushing 26 has an embedded contact ring 31, preferably embossed as shown best in Figure 3 for better contact with head 30. The ring 31 has an integral angular portion 32 extending along one side of the bushing and into its aforesaid recess for engagement by the contact screw 28.

The other or outer end of the bushing 26 is reduced and threaded for the reception of an internally threaded cup-shaped member 33 forming an adjustable abutment for one end of a coil spring 34, in the bore 20, whose opposite end engages the inner face of the diaphragm 22. The external face of the member 33 is toothed, as best shown at 35 in Figure 2, for engagement by a worm shaft 36 having bearing in a horizontal bore 37 of the stem 10 through a ring 38 threaded in said bore. The exposed end of worm shaft 36 is slotted, as shown in Figure 2, for convenient engagement by a screw driver and the like so that it may be rotated to bring about shifting movement of the member 33 and in this way adjust the tension of spring 34.

With the parts in the effective position shown in Figure 1 and the diaphragm subjected upon its outer face to the internal pressure of the tire tube 14 greater than the opposing pressure of spring 34, it is obvious the pin 25 will be shifted inwardly so as to space its contact head 30 out of contact with the ring 31. When however, the pressure within the tire tube 14 falls below the pressure of spring 34, the latter will, through the head 24 force outward flexure of the diaphragm and permit pin 25 to move outwardly so that its contact head 30 will engage and make contact with the ring 31.

In mounting the invention, as thus far described, the wheel felly 18 has associated therewith a supporting disc 39 of insulating material, and is preferably reamed out so that a central cylindrical extension 40 of this disc may extend through the felly to receive a clamping nut 41 whereby the disc is effectively held in place. In placing the tire rim 17 on the felly 18 the chambered end 11 of the valve stem 10 passes through the supporting disc 39 and the parts are so proportioned that when the pin 17 is properly seated, the contact screw 28, before referred to, is opposite a portion of the disc 39.

Securely, though adjustably, fastened in the said portion of the disc 39 is a sleeve 42 whose inner portion houses a plunger 43 adapted to engage the contact screw 28 under tension of a spring 44. This plunger has only a limited movement in the sleeve, the latter of which is adjustably held in the disc 39 by a set screw 45. The outer end of the sleeve 42 has permanently fastened therein one end of a lead wire 46 which in practise forms part of a circuit through the indicator or annunciator, above mentioned, and the ground when the contact head 30 engages contact ring 31.

It thus becomes obvious my improvements permit of ready removal of the tire and rim without interference, and that such improvements enable me to fully carry out the objects first above stated and may be modified in many respects within the terms of the following claims.

I claim:

1. A tire valve stem for pressure indicators having a chambered end for the reception of a tire valve and having a channel leading therethrough and a bore extending therein from its opposite flanged end independent of said chamber and channel, a pressure supported diaphragm closing the outer end of said bore, a pair of contact members in the bore normally held in spaced apart relation by said diaphragm, and spring means for forcing said contacts into engagement upon failure of pressure against said diaphragm.

2. A tire valve stem for pressure indicators having a chambered end for the reception of a tire valve and having a channel leading therethrough and a bore extending therein from its opposite flanged end independent of said chamber and channel, a pressure supported diaphragm closing the outer end of said bore, a pair of contact members in the bore normally held in spaced apart relation by said diaphragm, a spring for causing engagement of said contacts upon failure of pressure against said diaphragm, and means for adjusting the tension of said spring.

3. A tire valve stem for pressure indicators having a chambered end for the reception of a tire valve and having a channel leading therethrough and a bore extending therein from its opposite flanged end independent of said chamber and channel, a pressure supported diaphragm closing the outer end of said bore, a bushing seated within the inner portion of said bore and having a contact ring, a contact member threaded through the wall of the stem to engage a portion of said ring, said member serving to lock the bushing in place, a pin movable through said busing and having a contact head at one end movable into and out of engagement with said ring, a member at the opposite end of the pin engaging the diaphragm, a spring bearing at one end against said engaging member, and an adjustable abutment in the bore for the opposite end of the spring whereby its tension may be regulated.

4. A tire valve stem for pressure indicators having a chambered end for the reception of a tire valve and having a channel leading therethrough and a bore extending therein from its opposite flanged end independent of said chamber and channel, a pressure supported diaphragm closing the outer end of said bore, a bushing seated within the inner portion of said bore and having a contact ring, a contact member threaded through the wall of the stem to engage a portion of said ring, said member serving to lock the bushing in place, a pin movable through said bushing and having a contact head at one end movable into and out of engagement with said ring, a member at the opposite end of the pin engaging the diaphragm, a spring bearing at one end against said engaging member, an abutment for the other end of the spring threaded in connection with said bushing, and a member mounted through the wall of the stem and exposed to the exterior thereof for rotating said abutment whereby it will be adjusted and the tension of the spring will be regulated.

In testimony whereof I affix my signature.

JOHN V. LOBDELL, Jr.